Aug. 28, 1962     M. E. PRATHER     3,051,818

ELECTRIC RANGE WITH SPILL-PROOF COOKING SURFACE

Filed March 31, 1960     2 Sheets-Sheet 1

INVENTOR.
MARVIN E. PRATHER
BY *Richard L Caslin*
HIS ATTORNEY

Aug. 28, 1962 M. E. PRATHER 3,051,818
ELECTRIC RANGE WITH SPILL-PROOF COOKING SURFACE
Filed March 31, 1960 2 Sheets-Sheet 2
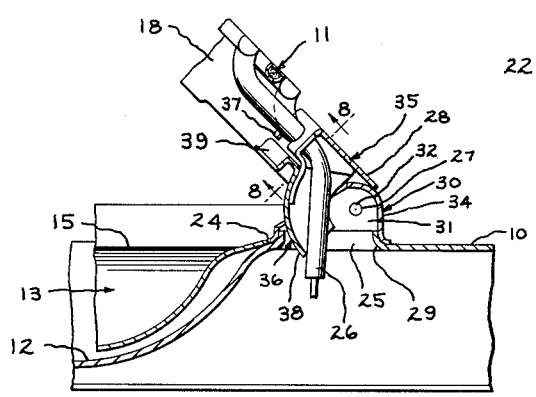
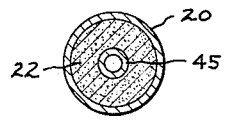
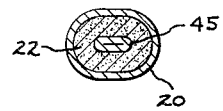
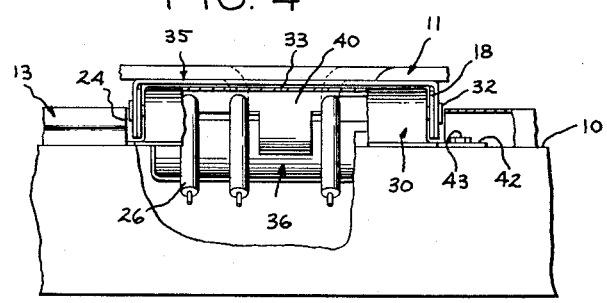
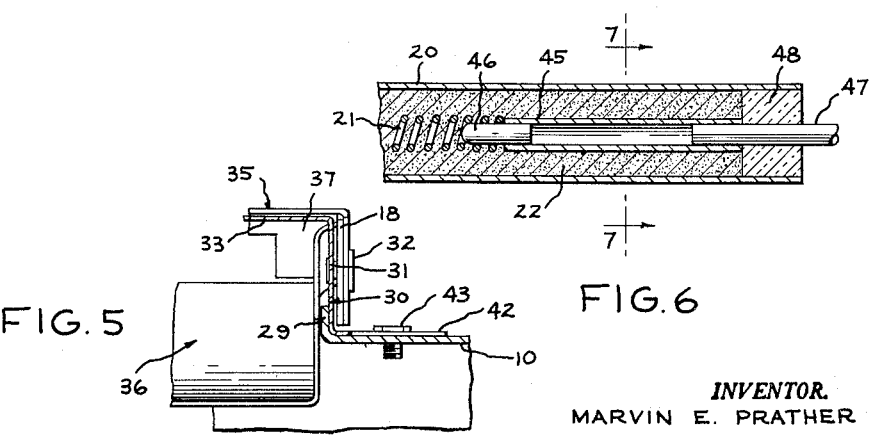
INVENTOR.
MARVIN E. PRATHER
BY Richard L Caelin
HIS ATTORNEY

United States Patent Office 3,051,818
Patented Aug. 28, 1962

3,051,818
ELECTRIC RANGE WITH SPILL-PROOF
COOKING SURFACE
Marvin E. Prather, Louisville, Ky., assignor to General
Electric Company, a corporation of New York
Filed Mar. 31, 1960, Ser. No. 19,006
4 Claims. (Cl. 219—37)

The present invention relates to an electric range where each heating element is positioned over an imperforate concavity in the cooking surface, and novel hinge means is provided over a hole in the cooking surface adjacent the convacity for receiving the terminal ends of the heating element therethrough and for preventing spillage of liquid through the hole.

The standard electric range is provided with a top cooking surface having a plurality of large holes therethrough for receiving a drawn annular reflector pan with a large central hole, and a heating element mounted across the top surface of the pan. Hinge means is also provided for each heating element so that the element may be pivoted to a raised position and the reflector pan removed so that a metal drip box under the cooking surface may be scrubbed clean. One advantage of the large holes in the cooking surface for receiving the heating elements is that only a small amount of the heat is lost from the heating elements to the cooking surface. One main disadvantage is that food and especially liquids will spill into the reflector pan and out the bottom thereof into the metal drip box supported under the heating elements. It is a laborious job to keep this box clean since it is difficult to reach all areas of the box through the openings and the lighting is poor.

A principal object of the present invention is to provide an electric range with a spill-proof cooking surface that is easy to maintain in a spotless condition and has a novel manner of hinging the heating elements to the top of the cooking surface.

A further object of the present invention is to provide a range with a spill-proof cooking surface where the terminal ends of the heating elements extend through small covered holes in the cooking surface, while liquids and food are prevented from spilling into the holes or boiling over into the holes.

A further object of the present invention is to provide a range with a spill-proof cooking surface where the heat emanating from the heating elements will not overheat the cooking surface and damage the porcelain enamel finish.

The present invention is embodied in an electric range having a top cooking surface with at least one imperforate concavity and preferably three or four. An imperforate reflector pan is positioned in the cavity and is suspended by outwardly extending flanges bearing on the cooking surface. The heating unit includes a heating element that is fastened on a supporting framework suspended across the top of the reflector pan. The reflector pan serves to reflect the heat from the heating element away from the cooking surface. A hole is formed in the cooking surface adjacent the concavity for receiving the terminal ends of the heating element therethrough. A hinge means is formed over the hole and above the cooking surface for pivotal engagement with the supporting framework of the heating element to allow the heating unit to be raised so the reflector pan may be removed and the concavity cleaned, when necessary. The hinge means includes a covering overlying the hole in the cooking surface to prevent liquids from spilling therein. Moreover, the edge of the hole is turned up slightly above the top of the cooking surface so that on boil-overs liquid will not fill the pan and flood into the hole receiving the terminals, but instead will run onto the cooking surface where it may be cleaned easily. Furthermore the terminal ends of the metal sheathed heating element are designed with an inner collapsible tube connected to the ends of the resistance heating wire or coil to render the terminals easy to bend where they extend through the hole in the cooking surface thereby preventing the reduction in thickness of the insulation between the tube and the outer metal sheath.

My invention will be better understood from the following description taken in connection with the accompanying drawings and its scope will be pointed out in the appended claims.

FIGURE 3 is a fragmentary elevational view similar to that of FIGURE 2 showing the hinged side of the heating element when it is in a raised position.

FIGURE 4 is an elevational view partly broken away taken on the lines 4—4 of FIGURE 1 showing the interior of the covering of the hinge means.

FIGURE 5 is an enlarged fragmentary view of the right side of the hinge means of FIGURE 4 showing the manner of pivotally connecting the various elements together.

FIGURE 6 is a longitudinal cross-sectional view of one of the terminal ends of the heating element showing the use of a collapsible inner tube connected to one end of the helical resistance heater wire.

FIGURE 7 is a transverse cross-sectional view of the heating element terminal taken on the line 7—7 of FIGURE 6 through the collapsible tube.

FIUGRE 8 is a transverse cross-sectional view similar to that of FIGURE 7 but taken after the inner tube has been flattened and the terminal bent as at line 8—8 of FIGURE 3.

Figure 1:
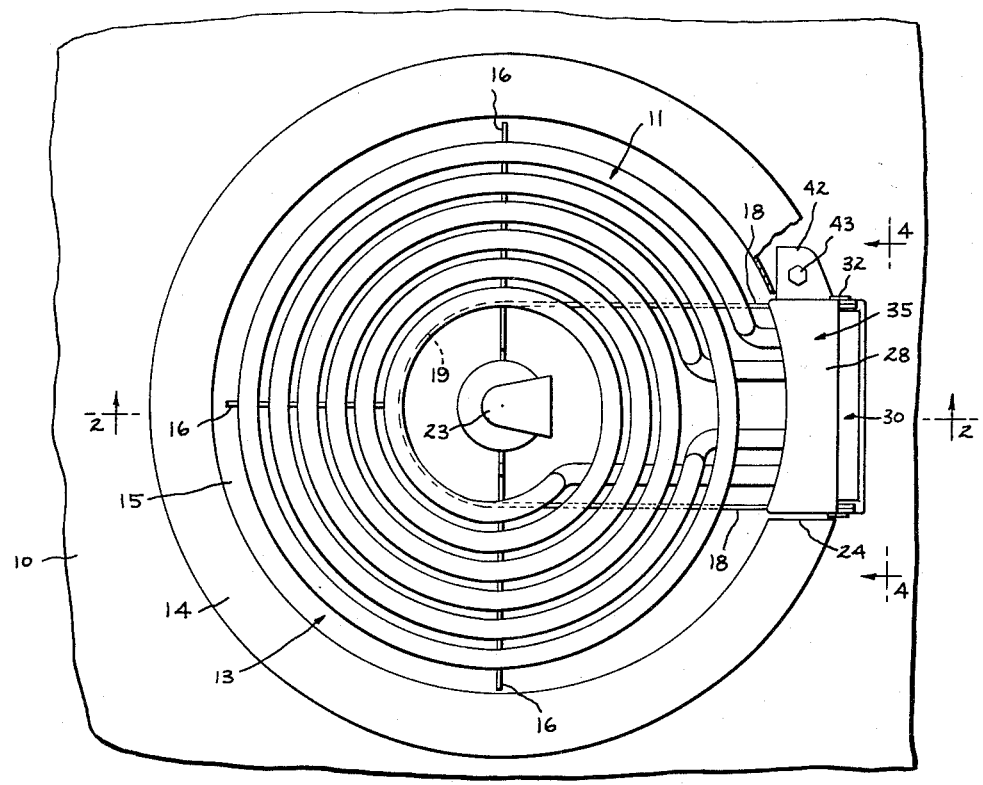
FIGURE 1 is a top plan view of a portion of the cooking surface of an electric ranges showing only one of the surface heating units embodying the present invention.
Figure 2:
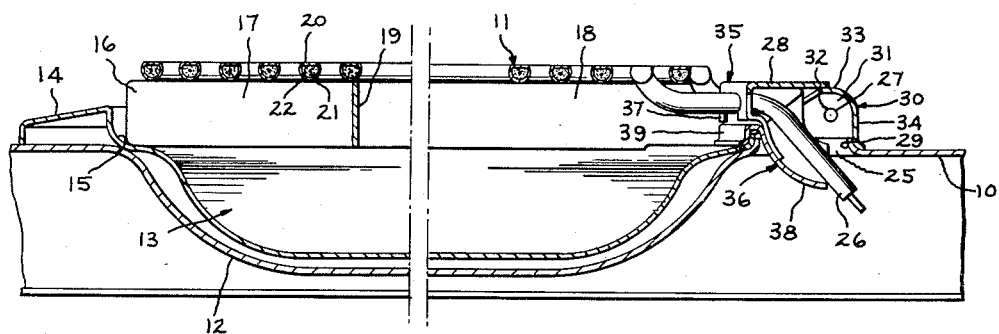
FIGURE 2 is a cross-sectional elevational view taken through the center of the hetaing element and its hinge means on the line 2—2 of FIGURE 1.

Turning now to a consideration of the drawings and in particular to FIGURES 1 and 2, 10 represents a portion of the top cooking surface of an electric range, while 11 is one of the metal sheathed heating elements provided on the cooking surface. A standard range usually includes four such heating units of various sizes and wattages, but the present invention will be explained by describing only one of them since the same invention would ordinarily be used on all of the surface heating elements. In FIGURE 2 there is shown a circular concavity 12 which is pressed down into the top cooking surface to form a "bird bath." This concavity is imperforate. A metal reflector pan 13 is positioned within the concavity 12 and provided with a horizontally disposed side flange 14 for supporting the weight of the pan from the top cooking surface 12 so that the bottom of the pan will be raised above and out of contact with the bottom wall of the concavity 12. This is to reduce the conduction of heat from the reflector pan into the cooking surface whereby the cooking surface will run as cool as possible and prolong the life of the porcelain enamel finish of the cooking surface.

The top edge of the pan 13 is also provided with a circular ledge 15 just inside the flange 14. The bottom of the ledge also rests upon the top cooking surface 10. The purpose of this ledge is to serve as the support for the arms 16 of a framework structure 17 that underlies the heating element 11 and is fastened thereto. This framework 17 comprises two parallel arms 18 that extend from one side of the heating element generally toward the center thereof where they are joined together by a semi-circular piece 19. Three radially extending arms 16 extend from the semi-circular portion 19 as is best seen in the plan view of FIGURE 1. The heating element has one or more spirally wound loops, each formed by an outer sheath member 20 that encloses a helically wound resistance wire 21 and is insulated from the wire by a powdered insulation 22 such as magnesium oxide that is tightly compacted into the sheath and then heat treated to reduce the insulation to a molded ceramic insulation as is well known in this art. A medallion 23 is fastened in the center of the heating element 11 to the framework 17 to reduce the size of the central opening within the loops as well as to show the brand name of the manufacturer.

As seen in FIGURE 2 a hole 25 of generally rectangular shape in plan view is punched into the cooking surface 10 adjacent the concavity 12 for receiving the terminal ends 26 of the heating element 11 therethrough. It is important to be able to raise the heating element for removing the reflector pan 13 so that it may be cleaned in the kitchen sink. Accordingly, a hinge means 27 is provided over the hole 25 for pivotally mounting the heating element 11 to the top of the cooking surface 10. Cooperating with the hinge means 27 is a covering 28 which is disposed around the terminals 26 and over the hole 25 in the cooking surface to prevent liquid from spilling through the hole 25 and onto the insulation (not shown) of the oven liner that underlies the cooking surface 10. The flange 14 of the pan is notched out at 24 to accommodate the hinge means 27 at one side of the heating unit as is seen in FIGURE 1.

In order to prevent liquids from overflowing the reflector pan and flooding into the hole 25 in the cooking surface, the edge 29 of the hole is turned upwardly to form a collar extending completely around the hole. The top surface of the collar rises above the cooking surface so that if the reflector pan 13 were to overflow through the notched portion 24 the liquid would flow onto the cooking surface 10 rather than into the hole 25. A hinge bracket 30 of generally rectangular shape in plan view is closely fitted over the raised edge 29 of the hole 25 in more or less mating engagement so that the hinge bracket has surfaces representing a detachable extension of the raised edge 29. On the opposite sides of the hinge plate 30 are a pair of upwardly projecting ears 31 each of which contain an opening for receiving a hinge pin 32 therein. Moreover, the hinge bracket 30 has a top wall 33 connecting the ears 31. The top wall is curved down into a back wall 34 to close the back of the hinge as best seen in FIGURE 2.

Fastened over the terminal ends 26 of the heating element is a covering 28 formed by a top cover 35 and a bottom cover 36 which encompass not only the terminals 26, but are attached to the parallel supporting arms 18 of the heating element framework. The top cover 35 has finger portions 37 disposed between the heating element terminals to close all large openings in the covering 28. The bottom cover 36 has an arcuately shaped and downwardly projecting front wall 38 which is closely spaced from the front side of the turned-up edge 29 of the hole in all positions of the heating element as is clearly seen in FIGURES 2 and 3. The bottom cover 36 also has a downwardly extending lip or shield 39 which overlies the raised edge 29 of the hole 25 and the mating front edge of the hinge bracket 30 to deflect any liquid that may spill on the cover. Looking at FIGURE 4 the top cover 35 has a downwardly and backwardly extending tongue 40 at the center which overlies the inner side of the arcuately shaped front wall 38 of the bottom cover 36 and is welded thereto as is seen in FIGURE 2. Moreover, the bottom plate is welded to the top cover 35 along the side edges of the two members so that the covering 28 is held rigidly to the framework arms 18 and the terminals 26 of the heating element.

Looking at the detailed view of FIGURE 5 of one side of the hinge, the top cover 35 is shown on the outside. Next there is the arm 18 of the supporting framework 17 for the heating element. Then there is the hinge plate 30 and, of course, the hinge pin 32 extending through all these members. The hinge plate 30 has oppositely directed horizontally disposed fastening tabs 42, each with an opening for receiving a screw 43 so that the heating unit may be fastened to the top of the cooking surface 10.

Much attention has been given above to the description of the structure centered around the hinge means 27 of the heating element. To summarize this structure it is not necessary that the covering 28 be water proof and completely immersible without leaking such as is the requirement in small electric appliances, but it is important to make the design so that the cooking surface will be splash-proof and flood-proof from overflowing of the reflector pan. This has been accomplished by providing a top cover 35 and a bottom cover 36 fastened over the terminal ends of the heating element and overlying the hole 25.

Turning to a consideration of the terminal end of the metal sheathed heating element shown in FIGURE 6, the helically wound resistance heater wire 21 is centered in the outer sheath 20 by a molded insulation 22 such as magnesium oxide. In the past a terminal pin has been insertede into the end of the heater wire 21 and welded thereto. Such terminal pin would extend through a ceramic plug or seal in the end of the metal sheath 20 and a tab terminal (not shown) would be welded to the free end of the pin. Such a terminal pin is of relatively heavy cross-section as compared with the heater wire so as to have low electrical resistance. Unfortunately when a sharp bend has been placed in the terminal end of the sheath, the molded insulation 22 would tend to thin out at the top and bottom of the terminal pin and shift over to the sides thereby causing a weakness in the insulating properties and possible premature failure.

The terminal end of the sheath is important in the hinged design disclosed above although it also has general utility in this art. The insulation is prevented from shifting by providing a collapsible metal tube 45 in the area of the bend. Each end of the tube is provided with a pin 46 and 47. Pin 46 is welded within the heater wire 21 as well as fixed within the tube while the other pin 47 has one end fixed within the tube and extends through a ceramic plug 48 and out beyond the end of the unit so that a tab may be welded thereto. A cross-section of the heating element taken on the line 7—7 of FIGURE 6 is shown in FIGURE 7. If the terminal end is first flattened and then bent sharply the inner tube will appear as shown in FIGURE 8 with important results that contribute to the success of the overall invention.

Modifications of this invention will occur to those skilled in the art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. In an electric range, a top cooking surface having at least one concavity, an imperforate reflector pan positioned in the concavity, the reflector pan having an outwardly directed flange for suspending the pan from the cooking surface off of the floor of the concavity, an electric heating unit positioned in the pan and having a series of terminals which extend from one side thereof, a hole formed in the cooking surface adjacent the concavity for receiving the terminal ends of the heating unit therethrough, and hinge means for pivoting the heating unit to a raised position so that the pan may be moved and the concavity cleaned, the hinge means including a cover over the hole to prevent liquids from spilling therein, the edge of the hole being raised slightly above the top of the cooking surface so that on boil-overs liquid will not fill the pan and flood into the hole but instead will run onto the cooking surface where it may be cleaned easily, the said cover extending both over, under and between the terminals of the heating unit, the said hinge means including a hinge bracket that encompasses the hole in the cooking surface and is fastened thereon, the hinge bracket including ears which are pivotally connected to the cover over the terminal ends of the heating unit, the bracket having a back surface between the two hinge ears for telescoping within the cover when the heating unit is raised, the cover having along its lower front surface an apron which is closely spaced with relation to the raised edge of the hole in all positions of the heating unit from the horizontal position to the raised position so as to restrict the spillage of liquids through the hole.

2. In an electric range as recited in claim 1 wherein the heating unit includes a supporting framework that underlies a spirally wound heating element having a plurality of terminals extending from one side thereof, the supporting framework being pivotally connected to the said hinge means, said cover for overlying the hole in the cooking surface extending around the pivoted end of the supporting framework so that the terminals of the heating unit may extend down through the hole in the cooking surface, the said cover having a surface that overlies the raised edge of the side of the hole that is nearest the heating unit.

3. In an electric range, a top cooking surface having at least one concavity, an electric heating element suspended across the top of the concavity and having a series of terminals extending from one side thereof, a hole formed in the cooking surface adjacent the concavity for receiving the terminal ends of the heating element therethrough, and hinge means for pivoting the heating element to a raised position so that the concavity may be cleaned, said hinge means including a covering that encompasses the terminal ends of the heating element and also overlies the hole in the cook-top to prevent liquids from spilling therein, the edge of the hole being raised slightly above the top of the cooking surface so that liquids will not flow into the hole but will spread out over the cooktop where they may be cleaned easily, the said covering includes a top cover, a bottom cover and a hinge bracket, the hinge bracket being fastened to the top of the cooking surface and being pivotally connected to the top and bottom covers to form a knuckle joint which allows the heating element to be raised while at the same time sealing the hole from liquids that might be spilled onto the cooking surface.

4. In an electric range as recited in claim 3 wherein an imperforate reflector pan is positioned under the heating element but out of contact with the interior of the concavity so as to reduce the heat conduction from the heating element to the cooking surface and instead reflect the heat upwardly.

References Cited in the file of this patent

UNITED STATES PATENTS

| 2,418,460 | Buehler | Apr. 8, 1947 |
| 2,633,523 | Gibson | Mar. 31, 1953 |
| 2,724,043 | McOrlly | Nov. 15, 1955 |
| 2,944,239 | Schrewelius | July 5, 1960 |
| 2,957,154 | Strokes | Oct. 18, 1960 |

FOREIGN PATENTS

| 970,421 | Germany | Sept. 18, 1958 |